N. PEMBERTON-BILLING.
STOVE.
APPLICATION FILED JULY 23, 1919.

1,349,732.

Patented Aug. 17, 1920.
7 SHEETS—SHEET 2.

INVENTOR

N. PEMBERTON-BILLING.
STOVE.
APPLICATION FILED JULY 23, 1919.

1,349,732.

Patented Aug. 17, 1920.
7 SHEETS—SHEET 4.

INVENTOR

UNITED STATES PATENT OFFICE.

NOEL PEMBERTON-BILLING, OF HERTFORD, ENGLAND.

STOVE.

1,349,732.

Specification of Letters Patent.   Patented Aug. 17, 1920.

Application filed July 23, 1919. Serial No. 312,854.

*To all whom it may concern:*

Be it known that I, NOEL PEMBERTON-BILLING, M. P., a subject of the King of England, residing at Hertford, in the county of Hertford, England, have invented certain new and useful Improvements in Stoves, of which the following is a specification.

This invention is for improvements in or relating to domestic heating- and cooking-stoves, and is particularly adapted, although not limited to that type of stove, by which a plurality of rooms may be heated from the one fire.

According to the present invention, a domestic heating-stove which is to be used for heating a plurality of receptacles, for example, boilers, ovens or hot cupboards is characterized by a fire-chamber, (with or without a water jacket surrounding the said chamber), a flue communicating between the upper interior of the fire-chamber and a port in a member outside the fire-chamber, another flue communicating with the lower end of the fire-chamber, and another port outside the said chamber, and a single distributing valve controlling the said ports and adapted to direct the main draft to any one or all of the said receptacles to be heated.

According to one construction, the said fire-chamber has a plurality of fire-place openings which are spaced apart around its vertical wall, and through which the fire in the fire-chamber can be exposed in two or more directions to the space around the chamber—for example to a plurality of dwelling rooms set around the stove, with the latter situated at a meeting of the angles of adjacent rooms.

These and other features of the invention will be more clearly understood with reference to the following description taken in connection with the accompanying drawings, in which are illustrated two preferred forms of the invention and in which:—

Like letters indicate like parts throughout the drawings.

With reference to Figs. 1 to 11, the construction shown is composed of three main portions, namely a lower portion containing the fire, ash-chute, kitchen range and fire-place; the central portion containing ovens, boilers, etc., and the third portion containing a hot cupboard. The stove as illustrated is adapted for heating four rooms—conveniently constituting a kitchen and three dwelling-rooms—with the one fire, the stove being situated at a meeting of the angles of different rooms. The boundaries of the meeting angles of the rooms extend from the radial webs X which are diagrammatically illustrated in Fig. 5 and constitute or support reveals for the fire-place openings.

Stoves of a similar general character have been described in my co-pending applications Serial Nos. 312,852 and 312,853, filed July 23, 1919.

To the outer edges of the reveals and at each side of the fire-place openings, doors may be conveniently hinged to swing about vertical hinges so that any one of the fire-places can be shut off from its room. Such doors could be lagged with heat-insulating material or could have in them mica or like windows.

The fire-chamber is composed of two coaxial cylinders A and B, shown particularly in Figs. 4 to 7, closed at their lower ends by means of a main base-plate C, and also closed at their upper ends. The cylinders A and B are spaced apart as to their side walls and upper ends, so as to form a water space or boiler between them. Extending through the two cylinders are four openings, one for each room, and designated by the letter O in the drawings. Through these openings O the fire can be exposed into the various rooms, the radial webs X constituting reveals for the fire-places. Above the openings O are fuel charging openings $O^1$, through which fuel may be fed to the fires, the openings $O^1$ being closed by doors $O^2$, hinged at their lower ends on horizontally disposed hinges, which open outwardly and assist as a guide to the charging of the coal into the fire-chamber. The doors $O^1$ in each room may be conveniently covered by slides $O^2$ shown in chain lines in Fig. 4, and in full lines in Fig. 5, and these slides $O^3$ can be moved downwardly to cover the openings O when the coal is being charged into the fire-chamber or when it is desired to vary the draft through the fire.

Below the level of the fire-place openings and extending across beneath the fire-chamber is a grate D, consisting of a frame having horizontal grate bars and adapted to slide in guides $D^1$. For effecting this, the handle $D^2$ extends through the lower portion of the casing of the stove, preferably into the kitchen range portion, so that by sliding out the grate D, the entire ash contents of the fire-chamber may be shot on to a sloping plate or chute $D^3$ along which it is discharged by gravity to a door $D^4$, from which it may be conveniently removed.

Figure 1:
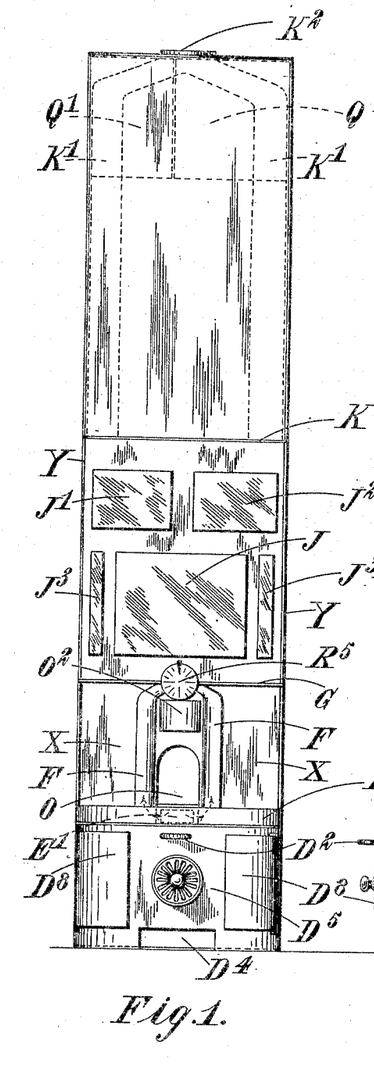
Figure 1 diagrammatically illustrates a general assembly view of the stove construction showing a kitchen range.

That portion of the stove beneath the fire-chamber is constituted by a box-like structure $D^5$, which contains in it a central chamber, as illustrated, bounded by the walls $D^6$ which contains the plate $D^3$, and for that portion of the structure open to the kitchen, the box-like structure $D^5$ provides receptacles $D^7$ for containing a coal supply. These receptacles are closed by doors $D^8$ as shown in Fig. 1.

Figure 2:
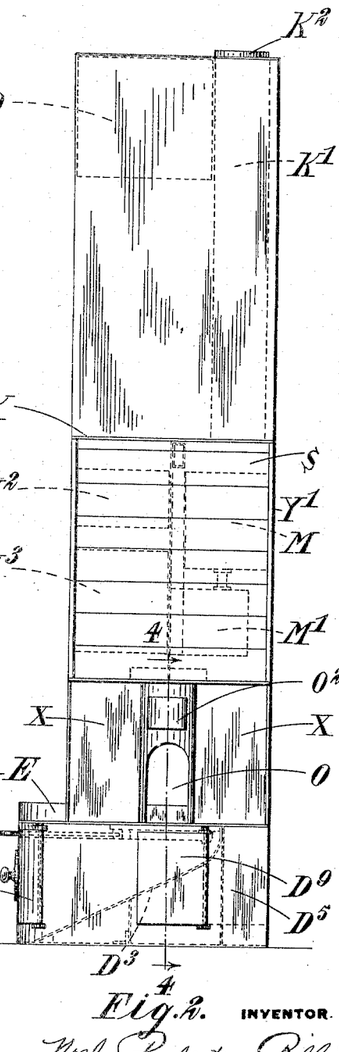
Fig. 2 is a view looking from the right of Fig. 1.
Figure 3:
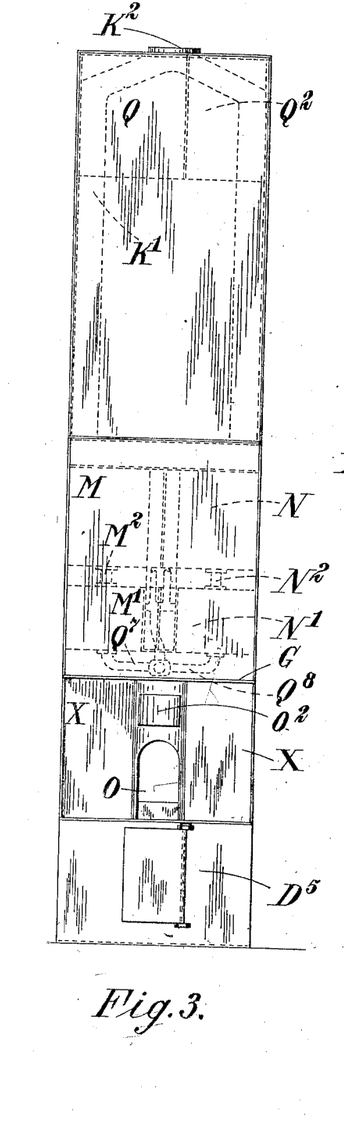
Fig. 3 is a rear view of Fig. 1.

For the other rooms a portion of the box structure $D^5$, inclosed by doors such as $D^9$, Fig. 2, is used as a coal receptacle for those rooms, and these receptacles are each separated by division plates from one another and from the coal receptacles for the kitchen.

Figures 8, 10, 11:
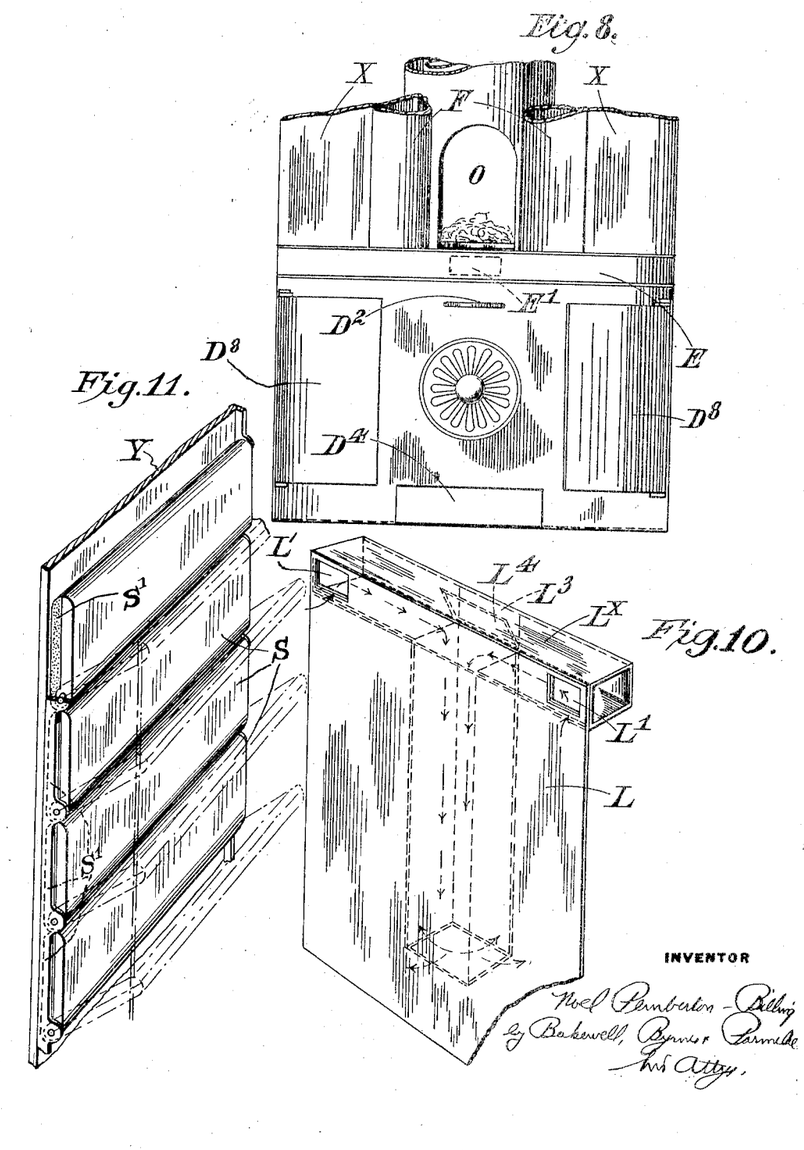
Fig. 8 is a detail of a portion of a kitchen range.
Fig. 10 is a detail of one of the draft passages.
Fig. 11 is a detailed construction of a portion of a heating-device for a dwelling-room.

For the kitchen range there is a front chamber E situated at the lower end of the fire-place opening O, and having a port $E^1$ diagrammatically illustrated in Fig. 8 communicating with the fire-place O of the kitchen range. The draft carrying the hot flue gases can be directed through the port $E^1$ into the chamber E and be circulated therein by the aid of any convenient baffles, and eventually be removed therefrom through vertical flues F at left and right of the fire-place opening O as shown particularly in Fig. 8. At their upper ends the flues F branch inwardly and communicate with a single port $G^1$ in a plate G situated near the upper end of the fire-chamber.

Figure 7:
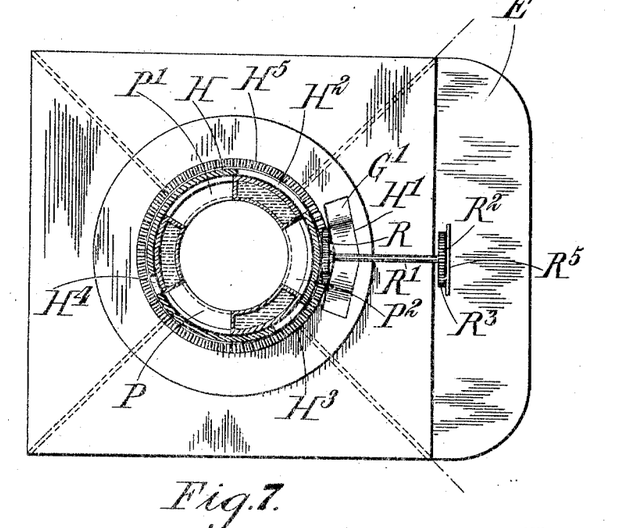
Fig. 7 is a section on the line 7—7 of Fig. 6.

In Fig. 7 the port $G^1$ in the plate G is immediately below a port in the control valve to be described hereinafter, and the reference letter $G^1$ refers to the port in the plate G, while the reference letter $H^1$ refers to the port in the valve H.

Figure 4:
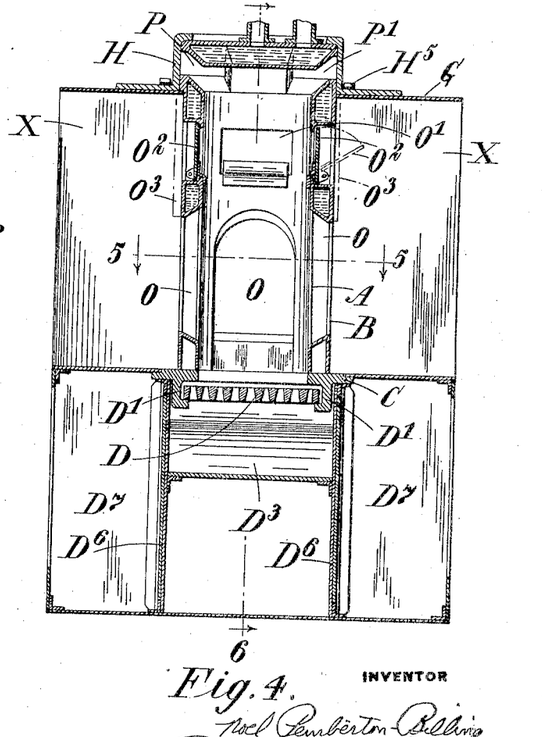
Fig. 4 is a section on the line 4—4 of Fig. 2 on an enlarged scale.
Figure 5:
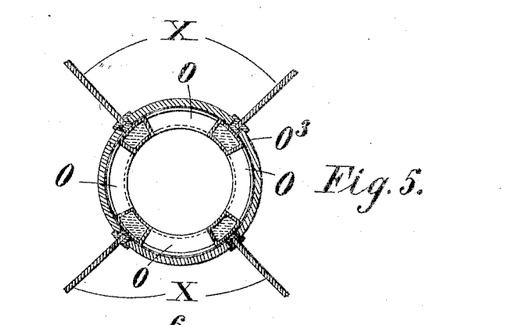
Fig. 5 is a part section on the line 5—5 of Fig. 4.
Figure 6:
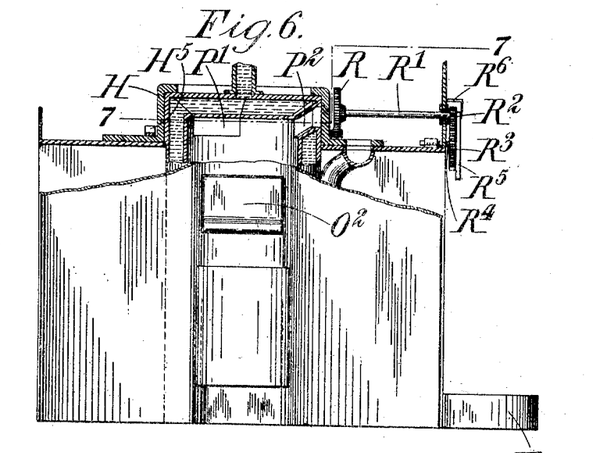
Fig. 6 is a part section on the line 6—6 of Fig. 4.

At the upper end of the fire-chamber are three ports, P, $P^1$, and $P^2$, shown more particularly in Figs. 4 and 7, these ports extending between the interior of the fire-chamber and the outer face of the cylinder B.

For controlling ports, P, $P^1$, $P^2$ and $G^1$, a single valve H in the form of a flanged cylinder has a sliding fit around the upper end of the cylinder B, and has in its flanged portion a port $H^1$ as previously described controlling the port $G^1$, and in the cylindrical portion the ports $H^2$, $H^3$ and $H^4$ controlling ports P, $P^1$ and $P^2$ in the manner to be described hereinafter.

Figure 9:
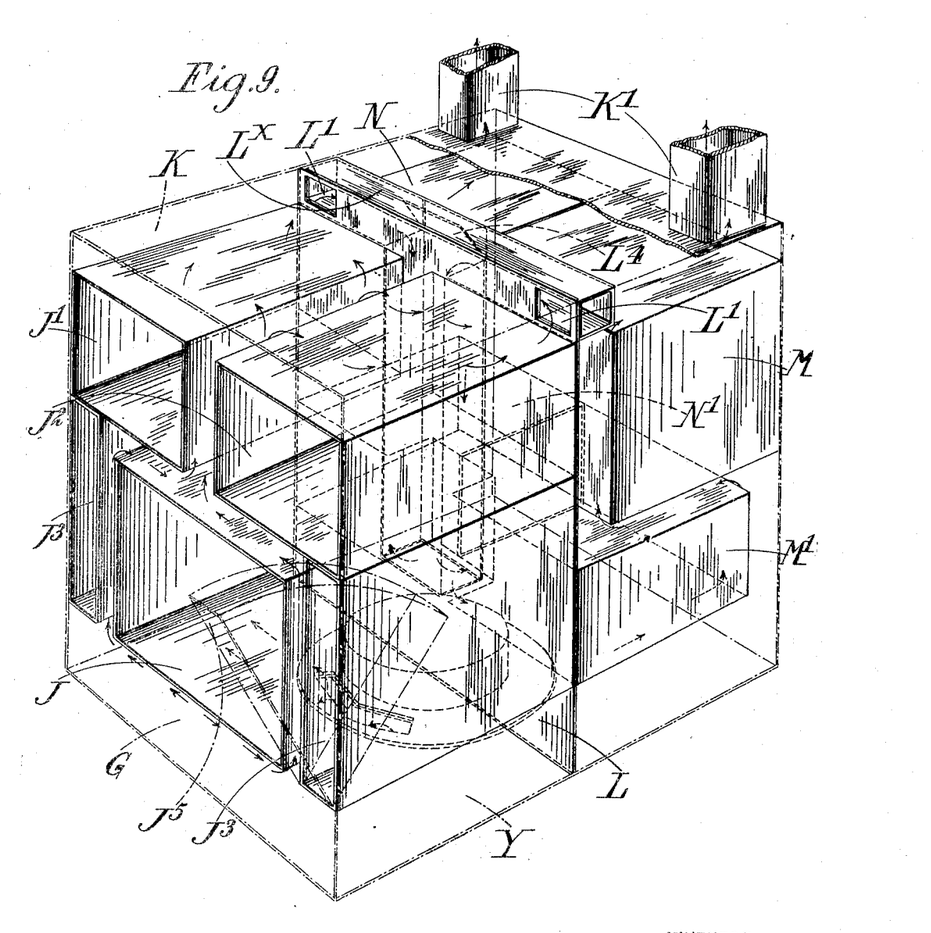
Fig. 9 is a diagrammatic view of a portion of the construction above the fire-chamber, showing the draft passages therein.

Above the level of the fire-chamber, the casing of the stove is continued and contains in it ovens and boilers which are diagrammatically illustrated chiefly in Fig. 9. Facing into the kitchen are three main ovens J $J^1$ and $J^2$. The ovens $J^1$ and $J^2$ are spaced apart from one another, and from the oven J, and are held close to the outer casing shown in dotted lines in Fig. 9, the reference letter Y referring to the main outside walls of the entire stove structure. The oven J is also spaced from two cupboards $J^3$, one on either side of it as shown, the lower surfaces of the oven J and cupboards $J^3$ being spaced from the bottom plate G. Above the ovens $J^1$ and spaced from their upper faces is a division plate extending transversely across the casing of the stove structure and indicated by the reference letter K.

The ovens J $J^1$ and $J^2$ and cupboards $J^3$ are all closed by doors, those for the cupboard $J^3$ being preferably hinged at their lower ends and carrying quadrant plate-holders on their inner faces. This is diagrammatically shown in Fig. 9 at $J^5$, and by means of these holders plates to be warmed can be inserted in the holders and moved into or withdrawn from the cupboards by closing or opening the doors.

Thus the central portion of the stove is constituted by a chamber formed of the plates G and K and the sides Y and a back. From front to back this chamber is divided by a central partition plate L, in the upper end of which are two ports $L^1$ opening into a T-shaped box LX constituting a flue and supported on that face of the plate L which is remote from the ovens just described. It will be understood that the side plates Y close the ends of the horizontal portion of this flue, so that the flue gases must pass down the center or stem of the T which terminates at its lower end a short distance above the base plate G. Shaped to fit around the stem of the flue are two sets of boilers, each set consisting of upper and lower boilers spaced from one another, one pair of boilers being designated M $M^1$, and the other pair N $N^1$. As shown more particularly in Figs. 2, 3 and 13 the boilers M $M^1$ are interconnected by means of a pipe $M^2$, and the boilers N and $N^1$ by a pipe $N^2$, both sets of boilers extending substantially across the width of the structure, although from front to back the lowermost boilers are inset from the backplate $Y^1$ of the structure while the upper boilers are spaced a small distance from the division plate L. There is also a space left between the upper parts of the boilers M and N and plate K. The latter is in communication at two corners with flues $K^1$ communicating with this space.

If desired a port $L^3$ may be provided in the structure $L^x$ which can be closed by a hinged door $L^4$. The latter may be moved by means of any convenient connection, extending for example into the kitchen, so as to swing it downwardly to close access to the stem of the T-shaped portion, and to direct the draft through the port $L^3$, or to close $L^3$ and allow the draft to have access to the stem.

Thus in the latter case it will be seen that the draft which first enters into the space beneath the ovens in a manner to be hereinafter described, can circulate around the ovens in a direction of the arrows, eventually passing out from contact with them through the ports $L^1$, $L^1$, then down the stem of the T-shaped flue to the space beneath the boilers $M^1$, $N^1$, around behind them in the direction of the arrows, so as to pass over their upper surface and the lower surfaces of the boilers M N, then around the front of those boilers back over the top of them and through the flues $K^1$.

The flues $K^1$ are extended through the upper chamber which constitutes a hot cupboard and are branched inwardly at their upper ends to the main flue outlet $K^2$ in communication with a chimney or other main draft outlet.

The water service for the stove is as follows:—within the upper end of the hot cupboard is a main hot cistern Q, connected in known manner with a feed cistern $Q^1$ controlled by a ball-cock valve, and in communication with the latter is also a subsidiary cistern $Q^2$. The cistern Q is appropriated for the supply of hot water for domestic use, and the cistern $Q^2$ is, in the example illustrated, for the supply of water to the boilers for heating radiators. A downcomer pipe $Q^3$ from the cistern Q enters the water-jacket surrounding the fire-chamber at $Q^4$ and a downcomer pipe $Q^5$ from the cistern $Q^2$ is in connection with the boiler $N^1$ $M^1$. An uptake pipe from the water-jacket surrounding the fire-chamber is shown at $Q^6$ and has two branch-pipes $Q^7$, $Q^8$ connected with the boilers $M^1$ and $N^1$ respectively. The branch pipes $Q^7$ and $Q^8$ are controlled by a two-way valve $Q^9$, so that either one set of boilers M $M^1$ or the other set N $N^1$ may be put in direct communication with the water-jacket—that is the main boiler. An uptake pipe $Q^{13}$ is connected between boiler M and domestic hot supply cistern Q.

Figure 13:
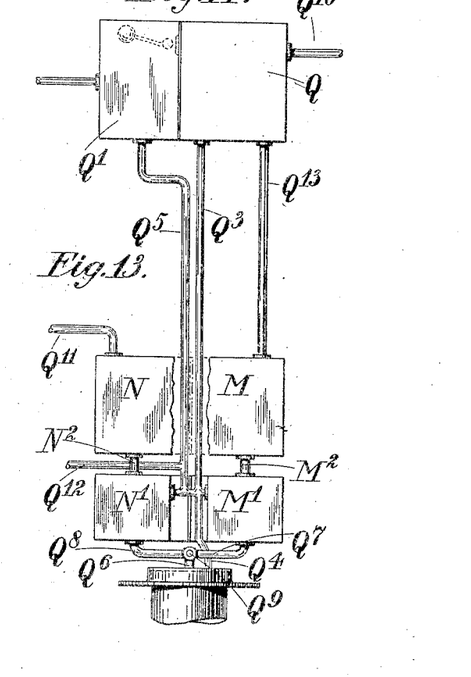
Figs. 13 and 14 diagrammatically illustrate a system of water supply.
Figure 14:
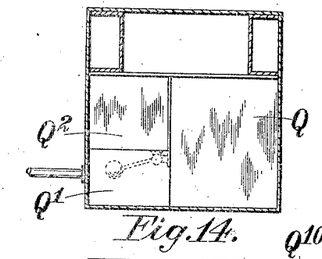

The water service is diagrammatically shown in Figs. 13 and 14 in which a pipe $Q^{10}$ is shown for supplying hot water for domestic supplies and flow and return pipes $Q^{11}$ and $Q^{12}$ are shown for the radiators; also the pipe $Q^5$ at its lower end, is in communication with the pipe $Q^3$, the latter being also connected to the boiler $M^1$.

In operation, the stove as described so far may be worked as follows:—

The fire in the fire-chamber may be exposed through the fire-place openings O to any one or all of the rooms surrounding it, and for normal draft the valve H will be moved to bring the port $H^2$ into register with the port $P^2$. In this position of the valve the port $G^1$ will be closed by the flange of the valve, and the other ports P and $P^1$ will be half and a quarter open respectively by the ports in the cylindrical portion. The main draft of the fire then takes place upwardly through the fire-chamber and out through the ports P $P^1$ $P^2$ into the space beneath the ovens and boilers. From thence it travels in the direction of the arrows shown in Fig. 9 and in the manner hereinbefore described to the flues K and $K^2$, the larger portion of the draft passing around the ovens and thence to the boilers and a smaller portion direct to the boilers.

When, however, it is desired to heat more intensely the chamber E which constitutes hob or hot-plate the valve is turned into the position shown in Fig. 7, so that the port $H^1$ uncovers the port $G^1$, while the ports P $P^1$ and $P^2$ are all closed. The draft then has to pass through the flues F and before reaching these flues it travels within the chamber E. After, however, passing through the flues F it is again admitted to the space beneath the ovens, and the subsequent circulation is as hereinbefore described around the ovens and boilers. Should it be desired, however, to heat for example the radiator circuit more intensely than other parts, the valve H is moved until the port $H^2$ uncovers the port P, which directs the bulk of the draft immediately underneath the boilers N, $N^1$, thus giving out to the boiler $N^1$ the most intense heat and cutting off a large proportion of the draft from the ovens. In this position of the valve, the ovens may be kept moderately cool, while the radiator boilers are mainly heated, but of course it will be understood that the domestic supply boilers are also heated, but less intensely.

When the valve is further moved so that the port H² registers with the port P¹, the other ports controlled by the valve will be partially or completely closed and the bulk of the draft will be directed immediately underneath the boilers M M¹ thus causing the most intense heat to be directed to the boilers for domestic supply. It will be understood that intermediate positions for the valve can be utilized to bring about a partial main heating of more than one of the various receptacles to be heated and that graduations in temperature of the various parts may be brought about by the suitable operation of the valve H.

The valve H could conveniently be modified from the form in which it is shown, by eliminating the cylindrical portion, that is to say the top of the fire-chamber would terminate at the level of the plate G, and would have its three ports P P¹ and P² opening into that flat surface. A circular disk, constituting the valve, and having ports similar to those previously described could be employed for controlling the ports in the plate G in a similar manner.

For moving either type of valve, the following mechanism is employed: On the flange of the valve is a toothed rack H⁵ meshing with a pinion R on a spindle R¹, which carries at its other end a pinion R² meshing with another pinion R₃ supported on a spindle R⁴. The spindle R⁴ also carries an indicator disk R⁵ which moves with the pinion R³ in relation to a fixed index R⁶. The indicator disk would have suitable markings to indicate the position in which the valve is set by movement of the gear, the gearing being such that one complete rotation of the disk takes place during one complete rotation of the valve, preferably by rotating the spindle R¹.

Conveniently over the whole outer surface of the sides of the stove structure above the level of the fireplace opening, (that is to say that portion designated for example by the reference Y of the structure containing the ovens, boilers and hot cupboard and exposed to the rooms) is an outer skin formed of a number of transversely arranged hinged slats S, shown in Fig. 11, having a lagging S¹ of heat insulating material, so that when they are all closed in the position shown in full lines in Fig. 11, heat radiation from the surfaces exposed to the rooms is mainly cut off but when they are moved to the open position shown in dotted lines, heat radiates from the metal or other heat conducting surface of which the upper walls of the main structure are formed, thereby heating the rooms. Any convenient means for operating the slats on the "Venetian blind" principle may be employed.

Figure 12:
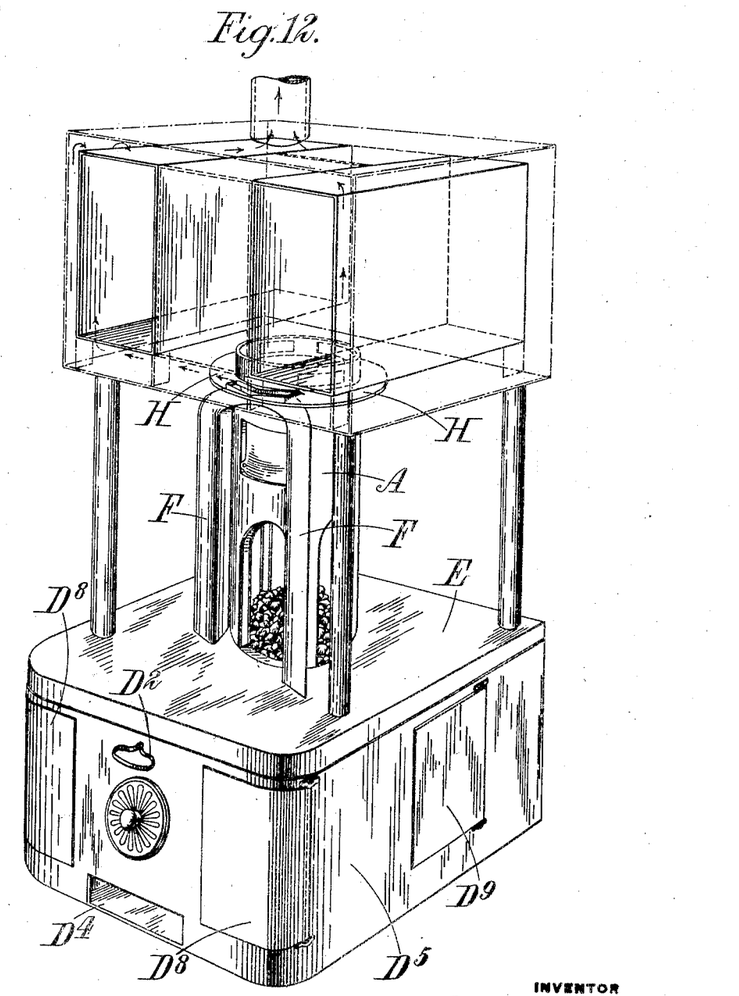
Fig. 12 diagrammatically illustrates a modified construction of stove, in which the whole construction is used as a kitchen range.

Fig. 12 shows diagrammatically a modification in which a stove embodying the present invention may be used solely for kitchen purposes. It consists of the central fire-chamber indicated by the reference letter A constructed in the manner hereinbefore described, and provided with valves, flues, ports and valve operating means also as hereinbefore described. The space, however, all around the fire-chamber A is clear and the chamber E extends from all sides around the chamber A as indicated. Fuel-supply boxes, ash chute and other fittings are as previously shown, and at the upper end of the fire-chamber any number of receptacles of which four are shown diagrammatically, may be provided and may comprise ovens, boilers, etc. The valve controls ports in such a manner that the draft may be directed to any one receptacle or set of receptacles, and the fire-chamber A may have several fire-place openings or may be provided with a single opening as may be found most convenient.

It is obvious that although two constructions have been described in detail in the foregoing description, many of the details of the construction may be modified and varied without departing from the spirit of the invention.

What I claim as my invention and desire to secure by Letters Patent is:—

1. For a domestic heating stove which is to be used for heating a plurality of receptacles, the combination of a fire-chamber, a flue communicating between the upper interior of the fire-chamber and a port in a member outside the fire-chamber, another flue communicating between the lower end of the fire-chamber and another port in a member outside the fire-chamber, and a single distributing device for the flue gases issuing through the said ports, said device being adapted to direct the main draft to any one or all of the receptacles to be heated.

2. For a domestic heating stove which is to be used for heating a plurality of receptacles, the combination of a fire-chamber, a water jacket surrounding the fire-chamber, a flue communicating between the upper interior of the fire-chamber and a port in a member outside the fire-chamber, another flue communicating between the lower end of the fire-chamber and another port in a member outside the fire-chamber, and a single distributing device for the flue gases issuing through the said ports, said device being adapted to direct the main draft to any one or all of the receptacles to be heated.

3. For a domestic heating stove which is to be used for heating a plurality of receptacles, the combination of a fire-chamber having a plurality of fire-place openings which are spaced apart around its vertical wall, and through which the fire in the fire-chamber can be exposed in two or more directions to the space around the chamber, a flue communicating between the upper interior of the fire-chamber and a port in a member outside the fire-chamber, another flue communicating between the lower end of the fire-chamber and another port in a member outside the fire-chamber, and a single distributing device for the flue gases issuing through the said ports, said device being adapted to direct the main draft to any one or all of the receptacles to be heated.

4. For a domestic heating stove which is to be used for heating a plurality of receptacles, the combination of a fire-chamber, a flue communicating between the upper interior of the fire-chamber and a port in a member outside the fire-chamber, another flue communicating between the lower end of the fire-chamber and another port in a member outside the fire-chamber, a single distributing device for the flue gases issuing through the said ports, said device being adapted to direct the main draft to any one or all of the receptacles to be heated, and an ash chute disposed beneath the grate in the fire-chamber and contained in a closed box-like structure below the fire-chamber, the chute sloping downwardly from beneath the grate toward an outlet in the wall of the box-like structure.

5. For a domestic heating stove which is to be used for heating a plurality of receptacles, the combination of a fire-chamber, a water-jacket surrounding the fire-chamber, a flue communicating between the upper interior of the fire-chamber and a port in a member outside the fire-chamber, another flue communicating between the lower end of the fire-chamber and another port in a member outside the fire-chamber, and a single distributing device for the flue-gases issuing through the said ports, said device being adapted to direct the main draft to any desired number of the receptacles to be heated, said receptacles including ovens and boilers all situated above the upper end of the fire-chamber.

6. For a domestic heating stove which is to be used for heating a plurality of receptacles, the combination of a fire-chamber having a plurality of fire-place openings which are spaced apart around its vertical wall and through which the fire in the fire-chamber can be exposed in several directions to the space around the chamber, a water-jacket surrounding the fire-chamber, a flue communicating between the upper interior of the fire-chamber and a port in a member outside the fire-chamber, another flue communicating between the lower end of the fire-chamber and another port in a member outside the fire-chamber, and a single distributing device for the flue-gases issuing through the said ports, said device being adapted to direct the main draft to any desired number of the receptacles to be heated.

7. For a domestic heating stove which is to be used for heating a plurality of receptacles, the combination of a fire-chamber, a water-jacket surrounding the fire-chamber, a flue communicating between the upper interior of the fire-chamber and a port in a member outside the fire-chamber, another flue communicating between the lower end of the fire-chamber and another port in a member outside the fire-chamber, a single distributing device for the flue-gases issuing through the said ports, said device being adapted to direct the main draft to any desired number of the receptacles to be heated, and an ash chute disposed between the grate in the fire-chamber and contained in a closed box-like structure below the fire-chamber, the chute sloping downwardly from beneath the grate toward an outlet in the wall of the box-like structure.

8. For a domestic heating stove which is to be used for heating a plurality of receptacles, the combination of a fire-chamber, a water-jacket surrounding the fire-chamber, a flue communicating between the upper interior of the fire-chamber and a port in a member outside the fire-chamber, another flue communicating between the lower end of the fire-chamber, and another port in a member outside the fire-chamber, a single distributing device for the flue-gases issuing through the said ports, said device being adapted to direct the main draft to any desired number of the receptacles to be heated, and an indicator operatively connected with one end-member of a train of gears of which the other end-member is operatively connected with the distributing device aforesaid.

9. For a domestic heating stove which is to be used for heating a plurality of receptacles, the combination of a fire-chamber, a flue communicating between the upper interior of the fire-chamber and a port in a member outside the fire-chamber, another flue communicating between the lower end of the fire-chamber and another port in a member outside the fire-chamber, a single distributing valve for the flue gases issuing through the said ports, said valve being adapted to direct the main draft to any one or all of the receptacles to be heated, and an indicator operatively connected with one end-member of a train of gears of which the other end member is operatively connected with the distributing device aforesaid.

10. For a domestic heating stove which is to be used for heating a plurality of receptacles, the combination of a fire-chamber having a plurality of fire-place openings which are spaced apart around its vertical wall, and through which the fire in the fire-chamber can be exposed in two or more directions to the space around the chamber, a flue communicating between the upper interior of the fire-chamber and a port in a member outside the fire-chamber, another flue communicating between the lower end of the fire-chamber and another port in a member outside the fire-chamber, a single distributing valve for the flue gases issuing through the said ports, said valve being adapted to direct the main draft to any one or all of the receptacles to be heated, and an indicator operatively connected with one end member of a train of gears of which the other end member is operatively connected with the valve aforesaid.

11. For a domestic heating stove which is to be used for heating a plurality of receptacles, the combination of a fire-chamber, a flue communicating between the upper interior of the fire-chamber and a port in a member outside the fire-chamber, another flue communicating between the lower end of the fire-chamber and another port in a member outside the fire-chamber, a single distributing valve controlling the said ports and adapted to direct the main draft to any one or all of the receptacles to be heated, an ash chute beneath the fire-chamber and contained in a closed box-like structure below the fire-chamber, the chute sloping downwardly from beneath the grate on toward an outlet in the wall of the box-like structure, and an indicator operatively connected with one end member of a train of gears of which the other end member is operatively connected with the valve aforesaid.

12. A domestic cooking-apparatus comprising in combination a fire-chamber, a water-jacket surrounding said fire-chamber, a hollow base chamber at the lower end of the fire-chamber, receptacles to be heated and disposed at the upper end of the fire-chamber, a flue communicating between the upper interior of the fire-chamber and a port in a member outside the fire-chamber, means to lead the draft from the fire space of the fire-chamber into the said lower hollow chamber, flues leading from the latter to another port in a member outside the said chamber, and a single distributing device controlling the said ports and adapted to direct the main draft in its passage from the fire-chamber to any one or all of the said receptacles and base-chamber.

13. For a domestic heating stove which is to be used for heating a plurality of receptacles, the combination of a fire-chamber, a member outside the fire-chamber having ports in it, a flue communicating between the upper interior of the fire-chamber and one of the ports in said member, another flue communicating between the lower end of the fire-chamber and another port in said member, a single distributing device for the flue gases issuing through the said ports, said device being adapted to direct the main draft to any one or all of the receptacles to be heated, said receptacles including ovens and boilers situated above the upper end of the fire-chamber.

14. For a domestic heating stove which is to be used for heating a plurality of receptacles, the combination of a fire-chamber, a flue communicating between the upper interior of the fire-chamber and a port in a member outside the fire-chamber, another flue communicating between the lower end of the fire-chamber and another port in a member outside the fire-chamber, a single distributing device for the flue gases issuing through the said ports, said device being adapted to direct the main draft to any one or all of the receptacles to be heated, and which include ovens and boilers all situated above the upper end of the fire-chamber, and a hot cupboard situated above the ovens and boilers, having in it a flue and means to direct a portion of the draft through the said flue.

15. For a domestic heating stove which is to be used for heating a plurality of receptacles, the combination of a fire-chamber, a flue communicating between the upper interior of the fire-chamber and a port in a member outside the fire-chamber, another flue communicating between the lower end of the fire-chamber and another port in a member outside the fire-chamber, a single distributing device for the flue gases issuing through the said ports, said device being adapted to direct the main draft to any one or all of the receptacles to be heated, ovens and boilers above the upper end of the fire-chamber and inclosed in a casing common to them all, the ovens being separated from the boilers by a vertical partition within the casing, and flues arranged to lead the draft from the oven section to the boiler section of the casing.

16. For a domestic heating stove which is to be used for heating a plurality of receptacles, the combination of a fire-chamber, a flue communicating between the upper interior of the fire-chamber and a port in a member outside the fire-chamber, another flue communicating between the lower end of the fire-chamber and another port in a member outside the fire-chamber, a single distributing device for the flue gases issuing through the said ports, said device being adapted to direct the main draft to any one or all of the receptacles to be heated, ovens and boilers above the upper end of the fire-chamber and inclosed in a casing common to them all, the ovens being separated from the boilers by a vertical partition within the casing, and flues arranged to lead the draft from the oven section to the boiler section of the casing, a hot cupboard above the ovens and boilers, and flues within the hot cupboard into which the draft is directed from the boiler section of the casing aforesaid.

17. A domestic stove having a fire chamber for burning solid fuel, from which chamber is heated a series of receptacles, comprising a room, a boiler, an oven and a hot plate, said fire chamber having a series of ports leading therefrom, and a single means controlling said ports for directing heat to any desired number of said receptacles, substantially as described.

18. A domestic stove, comprising a fire chamber for burning solid fuel, a water jacket surrounding said chamber, there being a series of ports opening from outside the jacket into the interior of the fire chamber, a series of receptacles to be heated when said ports are opened, and a single means for controlling said ports, substantially as described.

19. A domestic stove, comprising a fire chamber for burning solid fuel, said chamber having a series of ports therein, a main heating chamber in communication with said ports, said chamber having heating openings through the sides thereof, a single means for regulating said openings, a series of receptacles in said chamber, and means for regulating the ports in the fire chamber for controlling the heating of any of said receptacles, substantially as described.

In testimony whereof I have signed my name to this specification.

NOEL PEMBERTON-BILLING.